G. & J. HOLLAND-LETZ.
GRINDING MILL.
APPLICATION FILED DEC. 18, 1908.
1,006,554.
Patented Oct. 24, 1911.
4 SHEETS—SHEET 1.
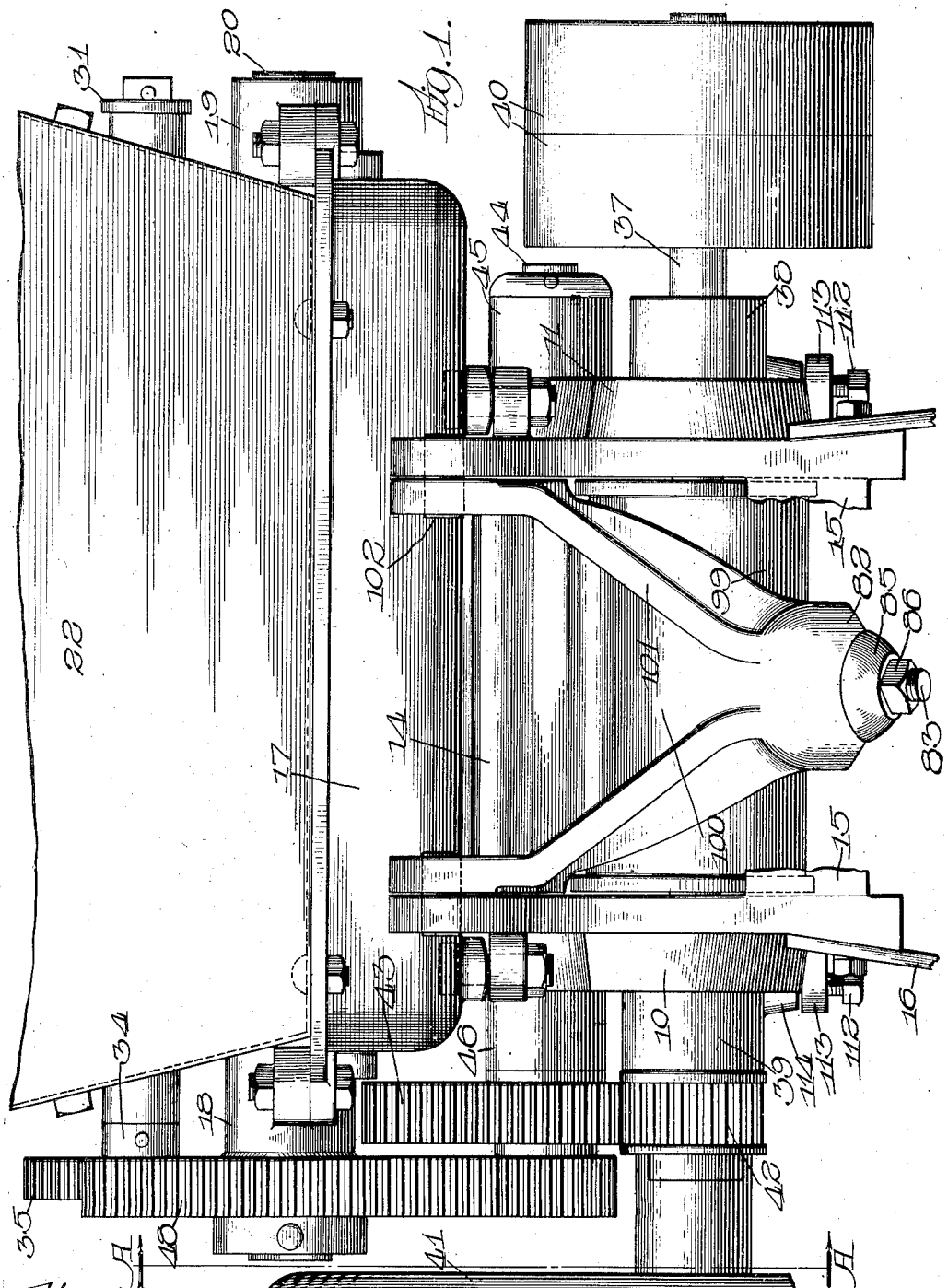

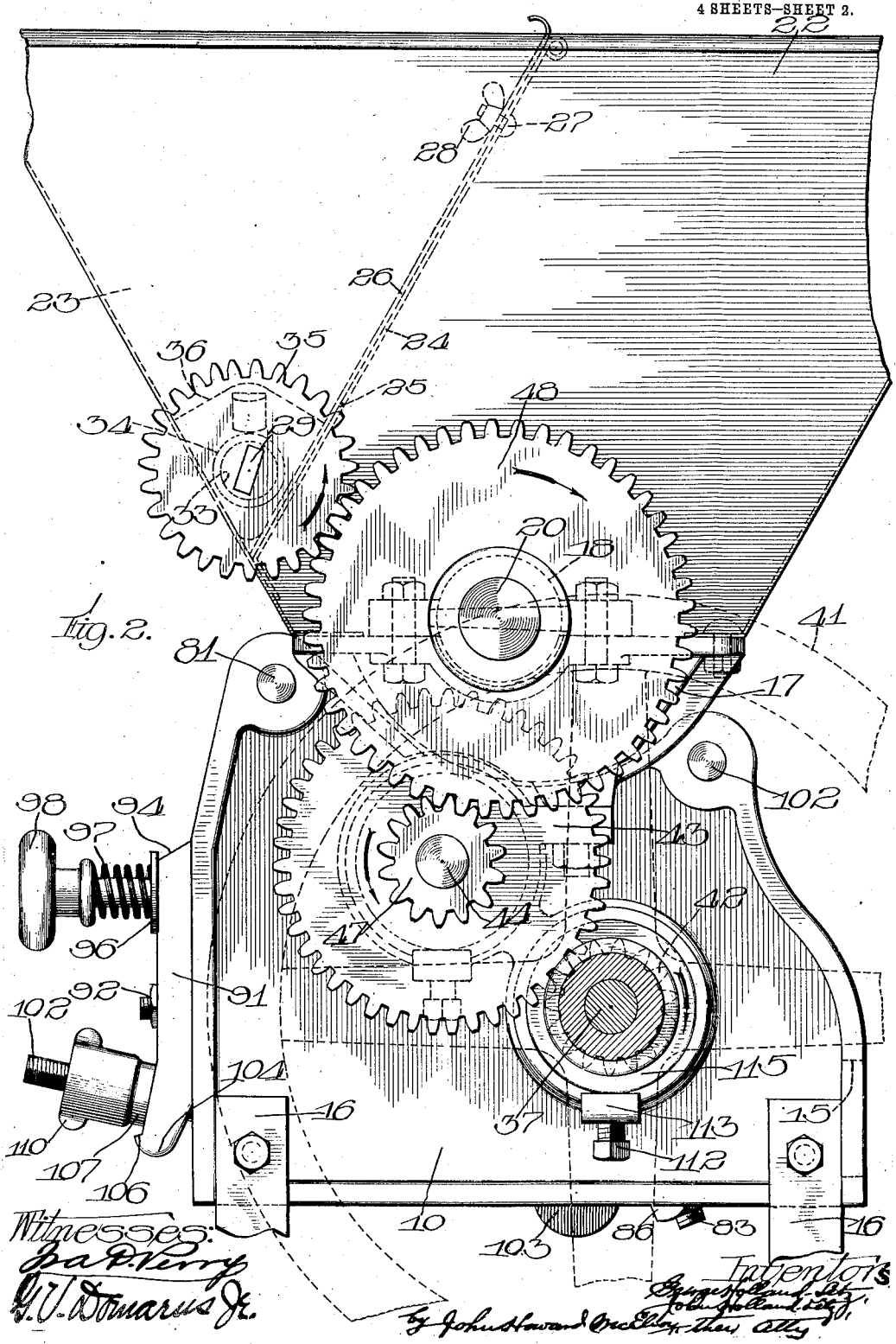

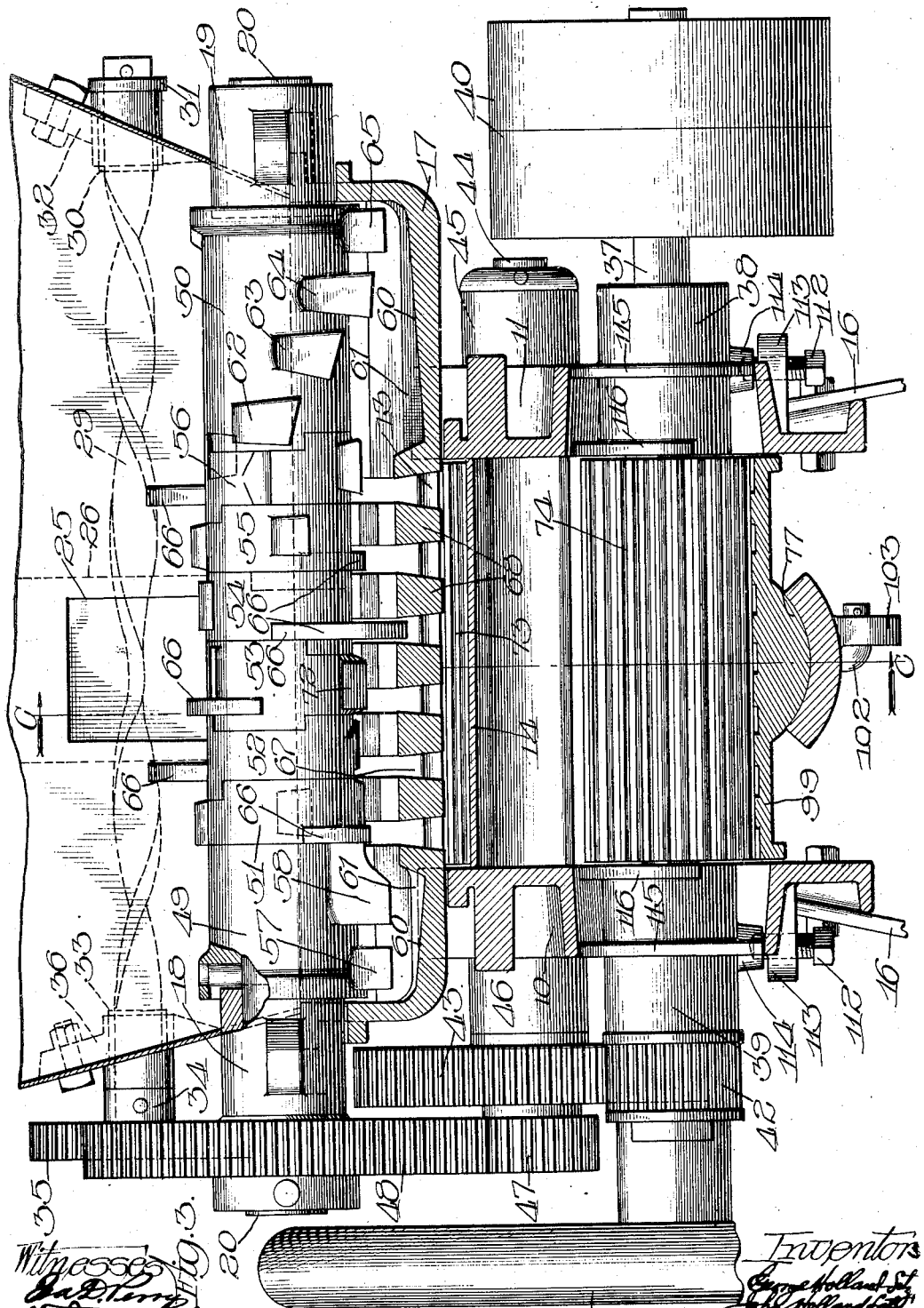

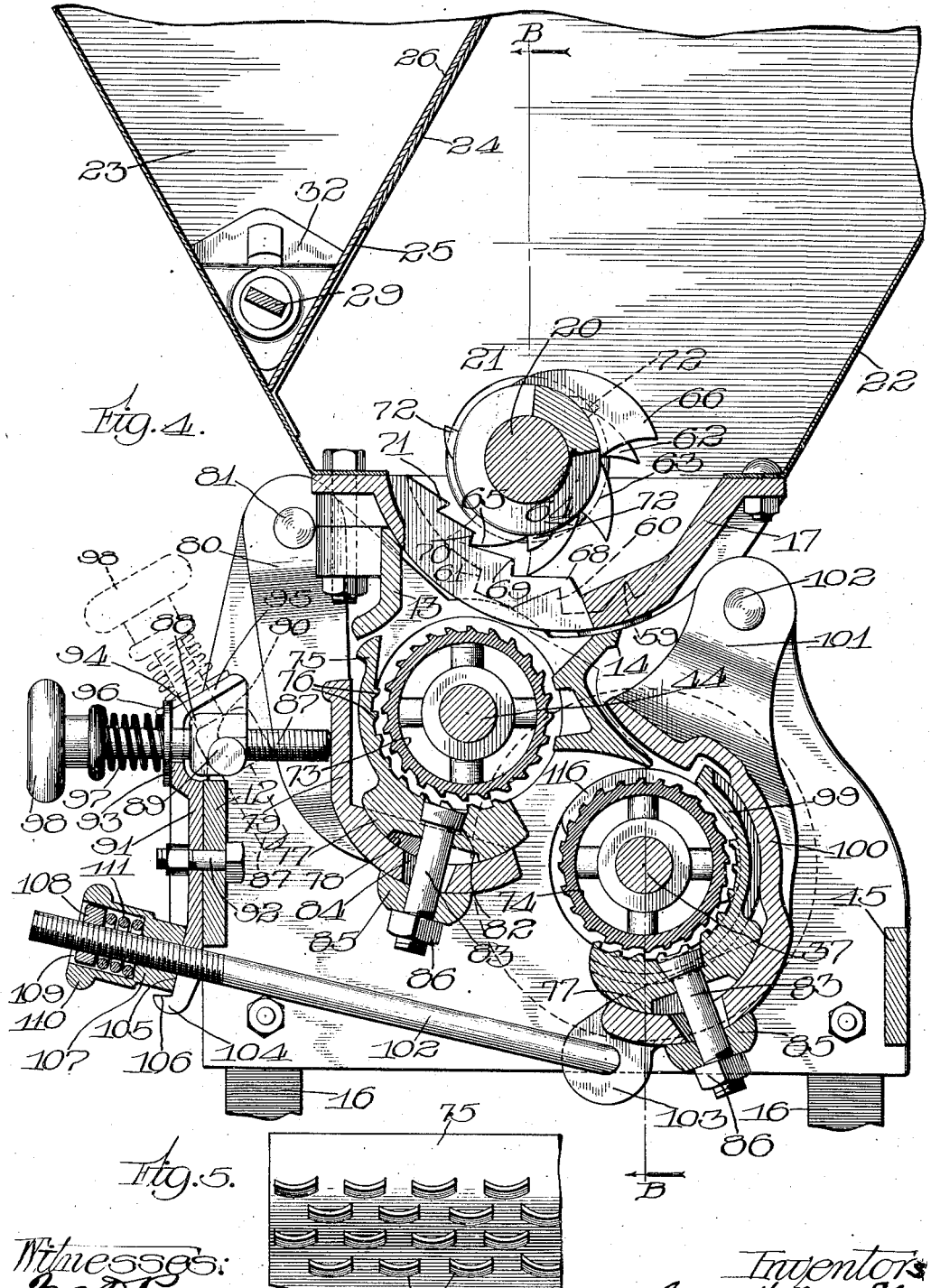
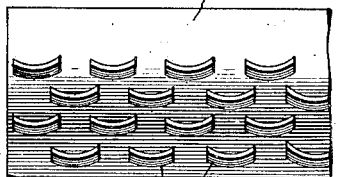

UNITED STATES PATENT OFFICE.

GEORGE HOLLAND-LETZ AND JOHN HOLLAND-LETZ, OF CROWN POINT, INDIANA.

GRINDING-MILL.

1,006,554.  Specification of Letters Patent.  Patented Oct. 24, 1911.

Application filed December 18, 1908. Serial No. 468,102.

*To all whom it may concern:*

Be it known that we, GEORGE HOLLAND-LETZ and JOHN HOLLAND-LETZ, citizens of the United States, and residents of Crown Point, in the county of Lake and State of Indiana, have invented certain new and useful Improvements in Grinding-Mills, of which the following is a full, clear, and exact specification.

Our invention is concerned with grinding mills adapted to grind up corn, feed, etc., and consists of certain novel combinations of elements, as fully described in the following specification and particularly pointed out in the claims.

To illustrate our invention we annex hereto four sheets of drawings, in which the same reference characters are used to designate identical parts in all the figures, of which, Figure 1 is a rear elevation of the machine with the upper portion of the hopper and a cross bar and the lower portion of the legs broken away. Fig. 2 is an end elevation in section on the line A—A of Fig. 1; Fig. 3 is a vertical section on the line B—B of Fig. 4; Fig. 4 is a vertical section on the line C—C of Fig. 3; and Fig. 5 is a detail view of a portion of one of the concaves showing the novel design of the teeth thereon.

In carrying out our invention, we preferably employ a pair of end castings 10 and 11, which furnish bearings for the various shafts extending transversely of the machine, and which will be hereinafter described. These castings are connected by the rigid cross-pieces 12, 13, 14 and 15, the cross-pieces 12 and 15 being plain bars, and the cross pieces 13 and 14 being of the design shown in cross section in Fig. 4, and adapted to coöperate with the swinging concave supporting element to form guiding passages through the machine for grain being operated upon.

The mill is preferably supported by suitable legs 16, of which there are preferably four, one at each corner, bolted thereto in a manner which will be readily apparent. Bolted onto the top of the rigid frame thus formed is a concave 17, which is semi-cylindrical in its general outline, and carries at its outer ends the bearings 18 and 19 for the shaft 20, upon which is secured the elements which are combined to make up the crushing roller 21. Secured upon the upper side of the casting 17 is the sheet metal hopper 22, which is preferably divided into the main compartment, in the bottom of which the crushing roller 21 is mounted, and the auxiliary compartment 23, which is spaced off from the main compartment by the metal plate 24, which is secured to the ends and to the adjacent side of the hopper, so as to make the supplemental hopper substantially triangular in cross-section. The purpose of this supplemental hopper is to receive the fine or shelled grain, and the main portion of the hopper is to receive the unshelled grain, such as corn on the cob, the purpose being to have the shelled grain fed in gradually with the coarse or unshelled grain or material, so as to prevent the machine from operating entirely on one kind of material at a time. The partition 24 is provided with the aperture 25, through which the fine grain passes into the main compartment, and the rate at which it passes may be regulated as closely as desired by use of the sliding gate 26, which fits over the partition 24, and is provided with an elongated slot near its upper end, through which is passed the threaded end of the stationary bolt 27, secured to the partition 24, and when the gate 26 has been adjusted as desired, it is secured in said adjustment by means of the wing nut 28 threaded upon the bolt 27. To insure the proper movement of the grain in the compartment 23 to the aperture 25, I preferably provide the agitator 29, which preferably takes the form of a flat bar, which is twisted to form a double helix, the two helixes beginning at a point opposite the aperture 25, so that when the agitator 29 is rotated in the proper direction, the grain in the compartment 23 will be fed to the discharge aperture 25. This agitator bar 29 has its ends, which are rectangular in cross section, fitted in the bearing sleeve 30, which has the collar 31, and is journaled in the bearing 32 secured to the end of the hopper, and at the other end in the sleeve 33, which is preferably formed integrally with the hub 34 of the gear wheel 35, the sleeve 33 being journaled in the bearing 36 secured to the hopper, so that as the gear wheel 35 is rotated by the driving connections to be described, the agitator will be rotated.

The general driving connections of the machine are as follows: The shaft 37 for the fine grinding roller is journaled in the bearings 38 and 39, and has secured on one end the belt pulley 40, and at the other end the fly wheel 41, and it also has secured to it the gear pinion 42, which meshes with the gear wheel 43, secured on the shaft 44 of the coarser grinding roller, which shaft 44 is journaled in the bearings 45 and 46 carried by the end castings 11 and 10 respectively. The shaft 44 also has secured on its end adjacent to the gear wheel 43, the gear pinion 47, which meshes with the gear wheel 48 secured on the shaft 20 of the crushing roller 21, and this gear wheel 48 meshes with the smaller gear wheel 35 on the agitator 29. From the foregoing connections, it will be apparent that as power is applied to the driving pulley 40, the lowermost fine grinding roll will be rotated at a high rate of speed, and the coarser grinding roll and the agitator will be rotated at lower rates of speed, and that the crushing roll 21 will be rotated most slowly of all.

The crushing roller 21 is made up of end sections 49 and 50, and the intermediate sections 51, 52, 53, 54, 55 and 56, although, of course, it will be understood that I may use any desired number of intermediate sections. The end section 49 has the pair of teeth 57 and 58 projecting therefrom and adapted to coöperate with the teeth 59, 60 and 61, formed on the upper surface of the bottom of the casting 17, and having a shape in cross section shown in dotted line in Fig. 4. The other end section 50 has the four teeth 62, 63, 64 and 65, which have the same general shape as seen in Fig. 4, and which have the generally helical outline tending to carry the material to the center of the concave, and the outer edges of these teeth are inclined, as shown, for this purpose.
These teeth 62, 63, 64 and 65 coöperate with the teeth 59, 60 and 61, which are found also at that end of the casting 17, just as at the other end. These teeth 59, 60 and 61 at both ends extend at an angle to the axis of the shaft 20, as indicated by the cross-section of the teeth 60 in Fig. 3, to assist the feed of the material by the teeth 57 and 58, and 62, 63, 64 and 65, toward the center of the crushing concave 17. The intermediate sections 51, 52, 53, 54 and 55 are of the same general design, and each has the elongated tooth or hook 66, which is adapted to pass through the coöperating slot 67 in the casting 17, there of course being six of these slots to correspond with the six central sections. These central sections also have the three short teeth 72, which are preferably spaced apart equal distances, and which coöperate with the teeth 68, 69, 70 and 71, formed on the concave between the slots 67, and as will be best seen in Fig. 4, these teeth are graduated, so that the teeth 71 are closer to the crushing roller than the teeth 68, so that a narrowing passage is produced, in which material is crushed by the coöperation of the rotating and stationary teeth, so that the crushed portion will drop through the slots 67 onto the coarse grinding roll 73.

The coarse grinding roll 73 may be of any desired construction, and need differ from the fine grinding roll 74 in only one point—i. e. its teeth should be longer and coarser so as to grind the material coarsely before passing to the fine grinding roll 74 for the final fine grinding. The grinding roller 73 is rigidly secured on the shaft 44, and coöperates with the concave 75, which is provided with teeth 76, of a size corresponding to the teeth or corrugations of the roll 73, and these teeth 76 preferably take the form shown in Fig. 5, where they will be seen to be crescent shaped in their general outline and arranged overlapping each other as shown. The concave 75 is provided at its center with the boss 77, the outer surface of which is a spherical curve, which is adapted to coöperate with the complementary spherical concave surface 78, formed at the center of the supporting bar 79, which has the arms 80 at its ends pivoted at 81 to the end plates 10 and 11. The concave 75 has the squared aperture 82 therein to accommodate the correspondingly shaped head of the bolt 83, which passes through the flaring aperture 84 in the bearing surface 78 of the supporting bar 79, and a suitably curved washer 85. The nut 86 threaded upon the end of the bolt 83 forms a suitable means for securing the concave in any desired position of adjustment relative to the grinding roller 74. The position of the bar 79 is controlled by the adjusting screw 87, the end of which bears against said bar, and which is threaded through the nut 88, which has the pair of pintles 89 coöperating with the curved bearing surfaces 90 formed on the bearing plate 91, which is secured to the cross-piece 12, as by the bolt and nut 92. This bearing plate 91 has the flat bearing surfaces 93 and 94 located at an angle of about 120° from each other, and the slot 95 extends through said bearing surfaces. The washer 96 is mounted on the screw bolt, and is held against one or the other of these surfaces 93 and 94 by means of the helically coiled expanding spring 97 interposed between said washer and the head 98 of the screw. Ordinarily, the screw is in the position shown in full lines in Fig. 4, in which the concave is held to its work and, more or less closely, depending upon the adjustment of the screw 87 in its nut 88. When the concave is to be released quickly to remedy an accident, the screw is swung to the position shown in dotted lines, in which the concave can be swung out and gotten at for purposes of removal and adjustment. When the fineness of grinding of the roller 73 is to be adjusted, the screw is merely turned in its socket.

The grinding roller 74 has the similarly shaped concave 99, which is held on the supporting bar 100 by adjusting mechanism, the same as that employed in connection with the coarse grinding concave 75, and the bar 100 is supported by the arms 101 pivoted at 102 to the end castings 10 and 11. The fine grinding concave, the teeth of which may be similar to the coarse grinding concave, except that they are finer, is adjusted by means of the screw rod 102, which is hooked into the ear 103 carried by the supporting bar 100, and has its threaded end extended through the recess 104 formed in the lower end of the plate 91, and provided with the bearing surface 105 and the detent lug 106. An adjusting nut 107 is threaded on the end of this rod 102, and I preferably employ a lock nut arrangement consisting of the nut 108, which is polygonal in its outline and coöperates with the correspondingly shaped polygonal aperture 109 formed in the nut 107, which nut 107 preferably has the operating flange 110. The helically coiled expanding spring 111 interposed between the bottom of the recess and the nut 108 serves to force the two nuts against the threads of the screw rods, so as to prevent their being accidentally turned by the jar of the mill as it is being driven.

In order to readily remove the lower grinding roll 74 and its shaft 37, the bearings 38 and 39 are preferably removable and secured in place by the screws 112 screwed through the lugs 113 on the end castings 10 and 11, and into the lugs 114 formed on the bottom of the bearings. To close up the ends of the apertures through which the roll can be withdrawn, the bearings 38 and 39 have the circular flanges 115, and to further prevent the escape of the grain from this fine grinding roller, these bearings have on their inner ends the additional flanges 116, which extend through about 180°, as best seen in Fig. 4, and in position to catch the grain as it is thrown from between the grinding roller 73 and the concave 75 onto the grinding roller 74.

The purpose of the ball and socket adjustment between the grinding concaves and their supporting bars is to permit of the concave being adjusted universally, so to speak, relatively to the grinding rolls, so that an even adjustment relative to said rolls may be secured throughout the length thereof, so as to insure the material being equally ground throughout the entire length of the rolls.

The general operation will be readily apparent. The coarse material or corn in the ear is thrown into the main hopper, and the fine material or shelled corn is thrown into the supplemental hopper whence it is fed at the proper rate of speed into the main hopper, so that the machine is constantly supplied with both the fine and coarse material, which is properly crushed by the roller 21 and forced through the slots 67 onto the coarse grinding roller 73, between which and the concave 75, it is coarsely ground, and whence it passes onto the fine roller 74, between which and the concave 99, the final fine grinding is completed.

While we have shown and described our invention as embodied in the form which we, at present, consider best adapted to carry out its purposes, it will be understood that it is capable of modifications, and that we do not desire to be limited in the interpretation of the following claims except as may be necessitated by the state of the prior art.

What we claim as new and desire to secure by Letters Patent of the United States is:

1. In a grinding mill, the combination with the crushing concave having the slots therein through which the material can pass and the teeth between the slots, of the crushing roll having the long teeth registering with and adapted to enter the slots, and the shorter teeth coöperating with the teeth of the concave between the slots.

2. In a grinding mill, the combination with the crushing concave having the parallel slots therein and the teeth between the slots at the center and the ribs constituting teeth at the ends, of the crushing roll having the long teeth registering with and adapted to enter the slots, and the shorter teeth coöperating with the teeth of the concave between the slots, and the helically arranged teeth coöperating with the ribs at the ends to feed the material to the slots.

3. In a grinding mill, the combination with a crushing roller on one shaft and its associated concave, of a coarse grinding concave and its coöperating roller on another shaft, a finer grinding concave into which the material from the coarser concave discharges and its roller on a third shaft, said shafts being parallel and spaced apart, and gearing for rotating the shafts of said crushing, coarse and fine grinding rollers at different peripheral velocities from a single power.

4. In a grinding mill, the combination with a hopper and a supplemental hopper having an aperture opening into the main hopper, an agitator in said supplemental hopper, a crushing roller and its concave located at the bottom of the main hopper, a coarse toothed concave and its grinding roller beneath the crushing roller, a finer-toothed roller and its concave beneath the coarse-toothed roller, and means for rotating said agitator and rollers at the relative speeds described.

5. In a grinding mill, the combination with a grinding roller, of a supporting element capable of being adjusted to and from the roller, a concave carried by said supporting element, said supporting element and concave having spherically curved bearing surfaces between them, and means for clamping said element and concave together, whereby the latter may be adjusted relative to the roller.

6. In a grinding mill, the combination with a grinding roller, of a pivoted supporting element, a set screw for adjusting the support to and from the roller, a concave carried by said supporting element, said supporting element and concave having spherically curved bearing surfaces between them, and means for clamping said element and concave together, whereby the latter may be adjusted relative to the roller.

7. In a grinding mill, the combination with a grinding roller, of a pivoted support carrying a concave, a pivoted nut journaled in stationary bearings adjacent the support, and a set screw threaded through the nut and coöperating with the pivoted support so that the set screw can be swung out of the plane of the concave.

8. In a grinding mill, the combination with the grinding roller, of a pivoted support carrying a concave, a nut journaled in stationary bearings adjacent the support, a set screw threaded through the nut and coöperating with the pivoted support, a spring-pressed abutment surrounding the set screw, and two stationary surfaces with which the abutment coöperates, one to hold the screw in and the other out of engagement.

9. In a grinding mill, the combination with a grinding roller, of a pivoted support carrying a concave, a rod pivoted to the support having a threaded end, a stationary slot through which said rod passes, a nut threaded on its end coöperating with the slot, a second nut coupled to turn with the first nut, and a helically coiled expanding spring surrounding the rod between the two nuts.

10. In a grinding mill, the combination with a grinding roller, of a pivoted support carrying a concave, a rod pivoted to the support having a threaded end, a stationary support through which it passes, a nut having a polygonally recessed aperture threaded on the end of the rod and coöperating with the slot, a second nut fitting in the aperture to turn with the first nut, and a helically coiled expanding spring surrounding the rod between the two nuts.

11. In a grinding mill, the combination with a roller, of a support adjustable to and from the roller and having a spherically curved bearing surface with a flaring aperture, centrally located therein, a concave having the complementary spherically curved bearing surface, and a bolt passing through the concave and the flaring aperture to secure the latter in any desired adjustment.

12. In a grinding mill, the combination with a grinding roller, of a supporting element capable of being adjusted to and from the roller, a concave carried by said supporting element, and curved bearing surfaces between said supporting element and concave whereby the latter may be adjusted at any desired angle relative to the roller.

13. In a grinding mill, the combination with a grinding roller, of a supporting element capable of being adjusted to and from the roller, a concave carried by said supporting element, and bearings between said supporting element and concave whereby the latter may be adjusted at any desired angle in any plane relative to the roller.

In witness whereof, we have hereunto set our hands and affixed our seals this 14th day of December, A. D. 1908.

GEORGE HOLLAND-LETZ. [L. S.]
  JOHN HOLLAND-LETZ. [L. S.]

Witnesses:
  EVA E. HOLLAND-LETZ,
  OTTO HOLLAND-LETZ.